US010161296B2

(12) United States Patent
Schock et al.

(10) Patent No.: US 10,161,296 B2
(45) Date of Patent: Dec. 25, 2018

(54) INTERNAL COMBUSTION ENGINE

(71) Applicant: BOARD OF TRUSTEES OF MICHIGAN STATE UNIVERSITY, East Lansing, MI (US)

(72) Inventors: Harold Schock, Brighton, MI (US); Guoming Zhu, Novi, MI (US); Elisa Toulson, Brighton, MI (US); Thomas Richard Stuecken, Eagle, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 109 days.

(21) Appl. No.: 15/132,317

(22) Filed: Apr. 19, 2016

(65) Prior Publication Data
US 2016/0230645 A1 Aug. 11, 2016

Related U.S. Application Data

(63) Continuation-in-part of application No. 14/086,168, filed on Nov. 21, 2013.
(Continued)

(51) Int. Cl.
*F02B 19/12* (2006.01)
*F02B 19/06* (2006.01)
(Continued)

(52) U.S. Cl.
CPC .......... *F02B 19/06* (2013.01); *F02B 19/1023* (2013.01); *F02B 19/1028* (2013.01);
(Continued)

(58) Field of Classification Search
CPC .......... F02B 19/00; F02B 19/06; F02B 19/10; F02B 19/1004; F02B 19/1019;
(Continued)

(56) References Cited

U.S. PATENT DOCUMENTS 2,050,392 A 8/1936 Starr
3,508,530 A * 4/1970 Clawson ............. F02B 19/1014
123/207

(Continued)

OTHER PUBLICATIONS

Gussak, L.A., et al.; "The Application of Lag-Process in Prechamber Engines," SAE Paper 790692, Society of Automotive Engineers, 1980, pp. 2355-2380.
(Continued)

*Primary Examiner* — Sizo Vilakazi
*Assistant Examiner* — Kevin R Steckbauer
(74) *Attorney, Agent, or Firm* — Harness, Dickey & Pierce, PLC

(57) ABSTRACT

An internal combustion engine includes a pre-chamber. In another aspect, pressure within a pre-chamber is equal to or greater than pressure within a main combustion chamber at least prior to ignition in the main combustion chamber. In yet another aspect, internal combustion engine control software automatically controls pressure within a turbulent jet ignition pre-chamber, controls a valve-actuator to admit a fuel-air charge into the pre-chamber, and causes an igniter to initiate combustion in the pressurized pre-chamber. This also permits the rate of combustion to be controlled in the primary chamber regardless of the air-fuel ratio or the diluent fraction in the main chamber. Another aspect employs a pre-chamber purge pump with separate air and fuel injection.

13 Claims, 13 Drawing Sheets

Related U.S. Application Data

(60) Provisional application No. 61/730,184, filed on Nov. 27, 2012.

(51) Int. Cl.

| | | |
|---|---|---|
| *F02B 35/00* | (2006.01) | |
| *F02B 19/10* | (2006.01) | |
| *F02F 1/42* | (2006.01) | |
| *F02P 23/00* | (2006.01) | |

(52) U.S. Cl.
CPC ...... *F02B 19/1042* (2013.01); *F02B 19/1052* (2013.01); *F02B 19/12* (2013.01); *F02B 35/00* (2013.01); *F02F 1/4285* (2013.01); *F02P 23/00* (2013.01); *Y02T 10/125* (2013.01)

(58) Field of Classification Search
CPC .............. F02B 19/1023; F02B 19/1028; F02B 19/1038; F02B 19/1042; F02B 19/1052; F02B 19/1057; F02B 19/1061; F02B 19/1071; F02B 19/108; F02B 19/1085; F02B 19/109; F02B 19/12
USPC ....... 123/253, 258, 260, 261, 267, 274, 275, 123/277, 289
See application file for complete search history.

(56) References Cited

U.S. PATENT DOCUMENTS

| | | | |
|---|---|---|---|
| 3,805,747 A | 4/1974 | Nakagawa et al. | |
| 3,924,592 A | 12/1975 | Miyaki et al. | |
| 3,957,021 A * | 5/1976 | Loyd, Jr. ................ | F02B 53/10 |
| | | | 123/209 |
| 4,060,058 A | 11/1977 | Hideg et al. | |
| 4,259,932 A | 4/1981 | Hideg et al. | |
| 4,300,497 A | 11/1981 | Webber | |
| 4,332,224 A | 6/1982 | Latsch et al. | |
| 4,429,669 A | 2/1984 | Burley | |
| 4,592,318 A | 6/1986 | Pouring | |
| 5,036,669 A * | 8/1991 | Earleson ............... | F02D 35/021 |
| | | | 123/239 |
| 5,081,969 A | 1/1992 | Long, III | |
| 5,454,356 A | 10/1995 | Kawamura | |
| 5,520,864 A | 5/1996 | Frei | |
| 6,694,944 B2 | 2/2004 | Agama et al. | |
| 6,854,439 B2 | 2/2005 | Regueiro | |
| 6,953,020 B2 | 10/2005 | Kojic et al. | |
| 7,000,596 B2 | 2/2006 | Zurloye et al. | |
| 7,100,567 B1 * | 9/2006 | Bailey .................... | F02B 19/06 |
| | | | 123/268 |
| 7,107,964 B2 | 9/2006 | Kojic et al. | |
| 7,398,743 B2 | 7/2008 | Fiveland | |
| 7,584,739 B2 | 9/2009 | Takahashi et al. | |
| 8,550,044 B2 * | 10/2013 | Dopona ................. | F01L 1/465 |
| | | | 123/90.14 |
| 8,857,405 B2 | 10/2014 | Attard | |
| 8,910,612 B2 * | 12/2014 | Woo ....................... | F02B 19/06 |
| | | | 123/267 |
| 8,925,518 B1 * | 1/2015 | Riley ...................... | F02B 19/10 |
| | | | 123/261 |
| 2006/0219210 A1 * | 10/2006 | Bailey .................... | F02B 19/06 |
| | | | 123/259 |
| 2012/0103302 A1 | 5/2012 | Attard | |
| 2012/0160217 A1 | 6/2012 | Ashizawa | |
| 2013/0220269 A1 * | 8/2013 | Woo ....................... | F02B 19/06 |
| | | | 123/260 |
| 2014/0109865 A1 * | 4/2014 | Lee ......................... | F02B 19/00 |
| | | | 123/260 |
| 2014/0144406 A1 | 5/2014 | Schock et al. | |
| 2014/0158083 A1 * | 6/2014 | Lee ......................... | F02B 19/06 |
| | | | 123/275 |
| 2014/0261298 A1 | 9/2014 | Sasidharan et al. | |
| 2014/0331960 A1 * | 11/2014 | Lee ......................... | F02B 19/06 |
| | | | 123/275 |
| 2015/0369143 A1 * | 12/2015 | Brown ................... | F02D 19/08 |
| | | | 123/470 |

OTHER PUBLICATIONS

Dainton, L.; "Nikolai Nikolaevich Semenov. Apr. 16, 1896-Sep. 25, 1986," Biographical Memoirs of Fellows of the Royal Society, vol. 36, Dec. 1, 1990, pp. 527-543.

Oppenheim, A. K.; "Prospects for Combustion in Piston Engines," SAE 2002-01-0999, Society of Automative Engineers, Mar. 4-7, 2002, 17 pages.

Toulson, Elisa; Thesis: "Applying Alternative Fuels in Place of Hydrogen to the Jet Ignition Process," The Department of Mechanical Engineering, the University of Melbourne, 2008, 402 pages.

Toulson, Elisa, et al.; "Gas Assisted Jet Ignition of Ultra-Lean LPG in a Spark Engine," SAE 2009-01-0506, SAE International, 2009, 21 pages.

Toulson, Elisa, et al.; "Modeling Alternative Prechamber Fuels in Jet Assisted Ignition of Gasoline and LPG," SAE 2009-01-0721, SAE International, 2009, 19 pages.

Attard, William P., et al.; "A Turbulent Jet Ignition Pre-Chamber Combustion System for Large Fuel Economy Improvements in a Modern Vehicle Powertrain," SAE 2010-01-1457, SAE Int. J. Engines, vol. 3, Issue 2, May 5, 2010, pp. 20-37.

Ma, Jia, et al.; "Adaptive Control of a Pneumatic Valve Actuator for an Internal Combustion Engine," IEEE Transactions on Control Systems Technology, 2010, 14 pages.

Attard, William P., et al.; "Flame Kernel Development for a Spark Initiated Pre-Chamber Combustion System Capable of High Load, High Efficiency and Near Zero NOx Emissions," SAE 2010-01-2260, SAE Int. J. Engines, vol. 3, Issue 2, Oct. 25, 2010, pp. 408-427.

Toulson, Elisa, et al.; "A Review of Pre-Chamer Initiated Jet Ignition Combustion Systems," SAE 2010-01-2263, SAE International, Oct. 25, 2010, 24 pages.

"MAHLE Turbulent Jet Ignition pre-chamber initiated combustion system supports high efficiency and near-zero engine-out NOx in naturally aspirated PFI engine," Green Car Congress, http://www.greencarcongress.com/2010/10/tji-20101027.html, published Oct. 27, 2010, 5 pages.

Attard, William P., et al.; "A New Combustion System Achieving High Drive Cycle Fuel Economy Improvements in a Modern Vehicle Powertrain," SAE 2011-01-0664, SAE International, Apr. 12, 2011, 23 pages.

Ma, Jia, et al.; "Adaptive Control of a Pneumatic Valve Actuator for an Internal Combustion Engine," IEEE Transactions of Control Systems Technology, vol. 19, No. 4, Jul. 2011, pp. 730-743.

Attard, William P.; "A Single Fuel Pre-Chamber Jet Ignition Powertrain Achieving High Load, High Efficiency and Near Zero NOx Emissions," JSAE 20119100, SAE 2011-01-2023, SAE International, 2011, pp. 734-746.

Attard, William P., et al.; "Spark Ignition and Pre-Chamber Turbulent Jet Ignition Combustion Visualization," SAE 2012-01-0823, SAE International, Apr. 16, 2012, 16 Pages.

Attard, William P., et al.; "A Lean Burn Gasoline Fueled Pre-Chamber Jet Ignition Combustion System Achieving High Efficiency and Low NOx at Part Load," SAE 2012-01-1146, SAE International, Apr. 16, 2012, 14 pages.

Toulson, Elisa, et al.; "Visualization of Propane and Natural Gas Spark Ignition and Turbulent Jet Ignition Combustion," SAE 2012-32-0002, SAE Int. J. Engines, vol. 5, Issue 4, Dec. 2012, 15 pages.

Schock, H., "Option #1: Air Injector and Fuel Injector Used," DOE presentation in Feb. of 2015.

* cited by examiner

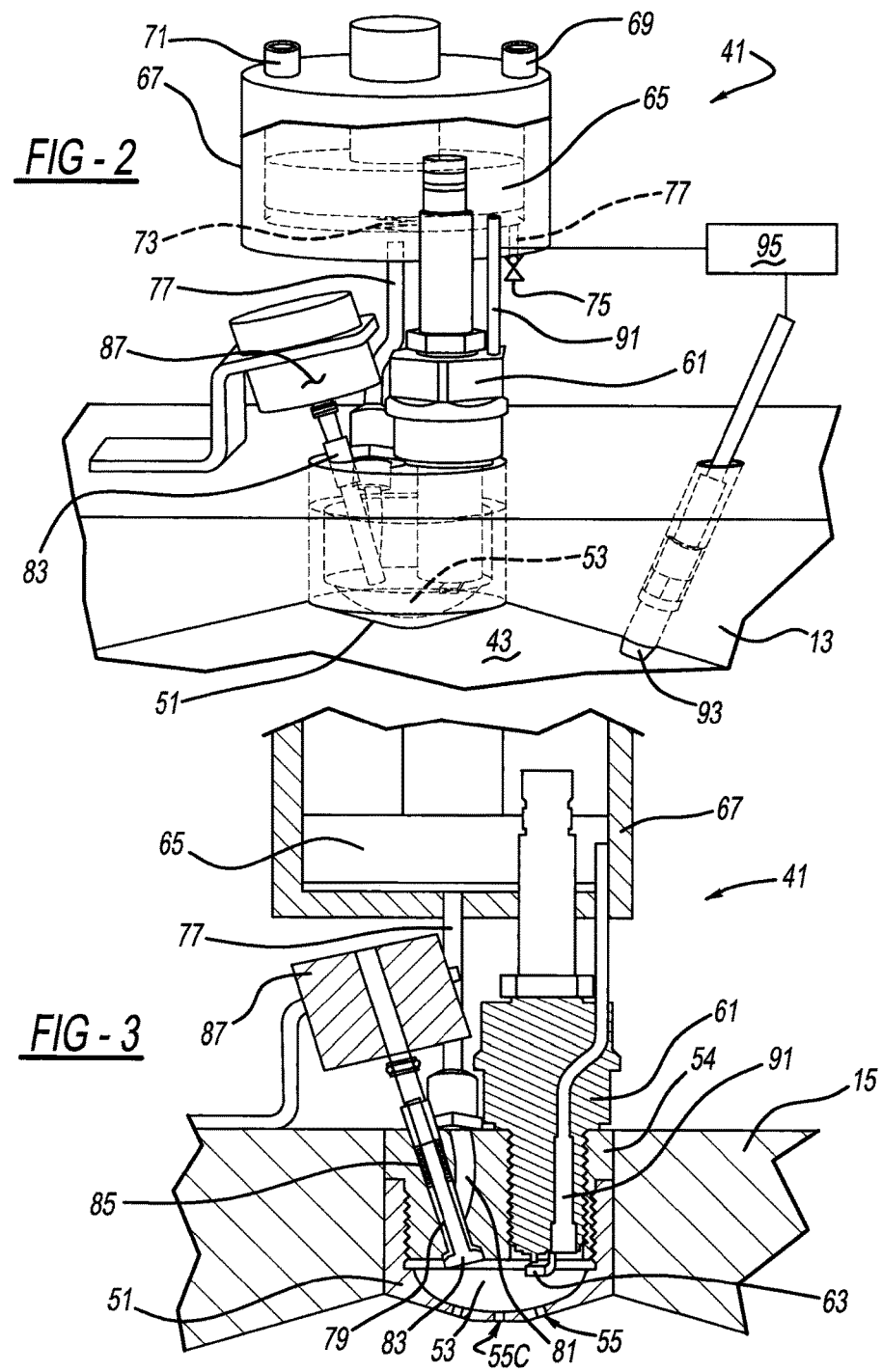

INTERNAL COMBUSTION ENGINE

CROSS-REFERENCE TO RELATED APPLICATIONS

This application is a continuation-in-part of U.S. patent application Ser. No. 14/086,168, filed on Nov. 21, 2013, which claims the benefit of U.S. Provisional Application Ser. No. 61/730,184, filed on Nov. 27, 2012, both of which are incorporated by reference herein.

BACKGROUND AND SUMMARY

The present application generally pertains to internal combustion engines and more particularly to an internal combustion engine including pre-chamber ignition.

Various pre-chamber ignition systems have been experimented with in an effort to reduce engine emissions while simultaneously increasing fuel efficiency. Such traditional systems are discussed in E. Toulson, H. Schock and W. Attard, "A Review of Pre-Chamber Initiated Jet Ignition Combustion Systems," SAE Technical Paper, 2010-01-2263 (Oct. 25, 2010). Further examples of conventional pre-chamber engines are U.S. Patent Publication No. 2012/0103302 entitled "Turbulent Jet Ignition Pre-Chamber Combustion System for Spark Ignition Engine" which published to Attard on May 3, 2012, U.S. Pat. No. 7,107,964 entitled "Control of Auto-Ignition Timing for Homogenous Combustion Jet Ignition Engines" which issued to Kojic et al. on Sep. 19, 2006, and U.S. Pat. No. 6,953,020 entitled "Control of Auto-Ignition Timing for Combustion in Piston Engines by PreChamber Compression Ignition" which issued to Kojic et al. on Oct. 11, 2005; all of which are incorporated by reference herein. It is noteworthy, however, that the Kojic pre-chamber piston is disadvantageously intended to solely compress the pre-chamber mixture to cause auto-ignition without a spark plug or the like. Differently, the Attard device only has fuel injected into the pre-chamber and the fuel-air mixture from the combustion chamber backfeeds into the pre-chamber thereby disadvantageously causing an uncontrolled fuel and air ratio within the pre-chamber. Therefore, neither of the traditional Kojic nor Attard devices precisely control the pre-chamber fuel and air mixture nor do they precisely control the pressure within the pre-chamber. Accordingly, conventional pre-chamber ignition devices make it difficult to ignite lean fuel-air mixtures, especially at lower temperatures and in cases where high exhaust gas residuals are used to maintain low main chamber temperatures.

In accordance with the present invention, an internal combustion engine includes a pre-chamber. In another aspect, pressure within a pre-chamber is equal to or greater than pressure within a main combustion chamber at least prior to ignition in the main combustion chamber. A further aspect provides a supplemental piston creating pressure and supplying a fuel-air mixture into a pre-chamber, and a spark or glow plug has an end located within the pre-chamber for ignition of the mixture therein. In yet another aspect, internal combustion engine control software automatically controls pressure within a turbulent jet ignition pre-chamber, controls a valve-actuator to admit a fuel-air charge into the pre-chamber, causes an igniter to initiate combustion in the pressurized pre-chamber, receives a signal corresponding to pressure in the pre-chamber, and receives a signal corresponding to such pressure in a main combustion chamber of an engine block. This also permits the rate of combustion to be controlled in the primary chamber regardless of the air-fuel ratio or the diluent fraction in the main chamber. Another aspect employs a pre-chamber purge pump with separate air and fuel injection. Moreover, an additional aspect separately supplies unmixed air and fuel into a turbulent jet ignition pre-chamber through a dual-mode, single injector unit. A method of operating an internal combustion engine in an automotive vehicle is also provided.

The internal combustion engine of the present invention is advantageous over traditional devices. For example, the present device and method precisely control a pre-chamber prior to the end of compression, fuel and air mixture while also precisely controlling and causing the pre-chamber pressure to be the same as or greater than that of the main combustion chamber during at least one operating condition. This reduces if not entirely prevents backfeeding from the main chamber to the pre-chamber. The present engine also provides significant pre-chamber purging with fresh air alone, during an intake stroke of the main driving piston and during the compression process depending on operating conditions. This pre-chamber purge also lowers the overall cycle average pre-chamber wall temperature, thereby reducing heat transfer losses over prior pre-chamber ignition attempts. Furthermore, the present device is expected to significantly improve combustion of a lean fuel-air mixture or one that is heavily diluted with exhaust gas recirculation, in the main combustion chamber, even at lower operating temperatures, which should greatly reduce undesirable NOx emissions while also significantly increasing fuel efficiency. It is noteworthy that the dual-mode, single injector unit is considerably easier to package in a smaller space within a production automotive vehicle engine as compared to prior systems and even compared to the other embodiments disclosed in the present application. Additional advantages and features of the present invention will become apparent when considering the following description and appended claims as well as the accompanying drawings.

BRIEF DESCRIPTION OF THE DRAWINGS

FIG. 2 is a perspective view showing a portion of the first embodiment internal combustion engine;

FIG. 3 is an enlarged and fragmentary cross-sectional view, like that of FIG. 1, showing a turbulent jet ignition system for the first embodiment internal combustion engine;

DETAILED DESCRIPTION

Figure 1:
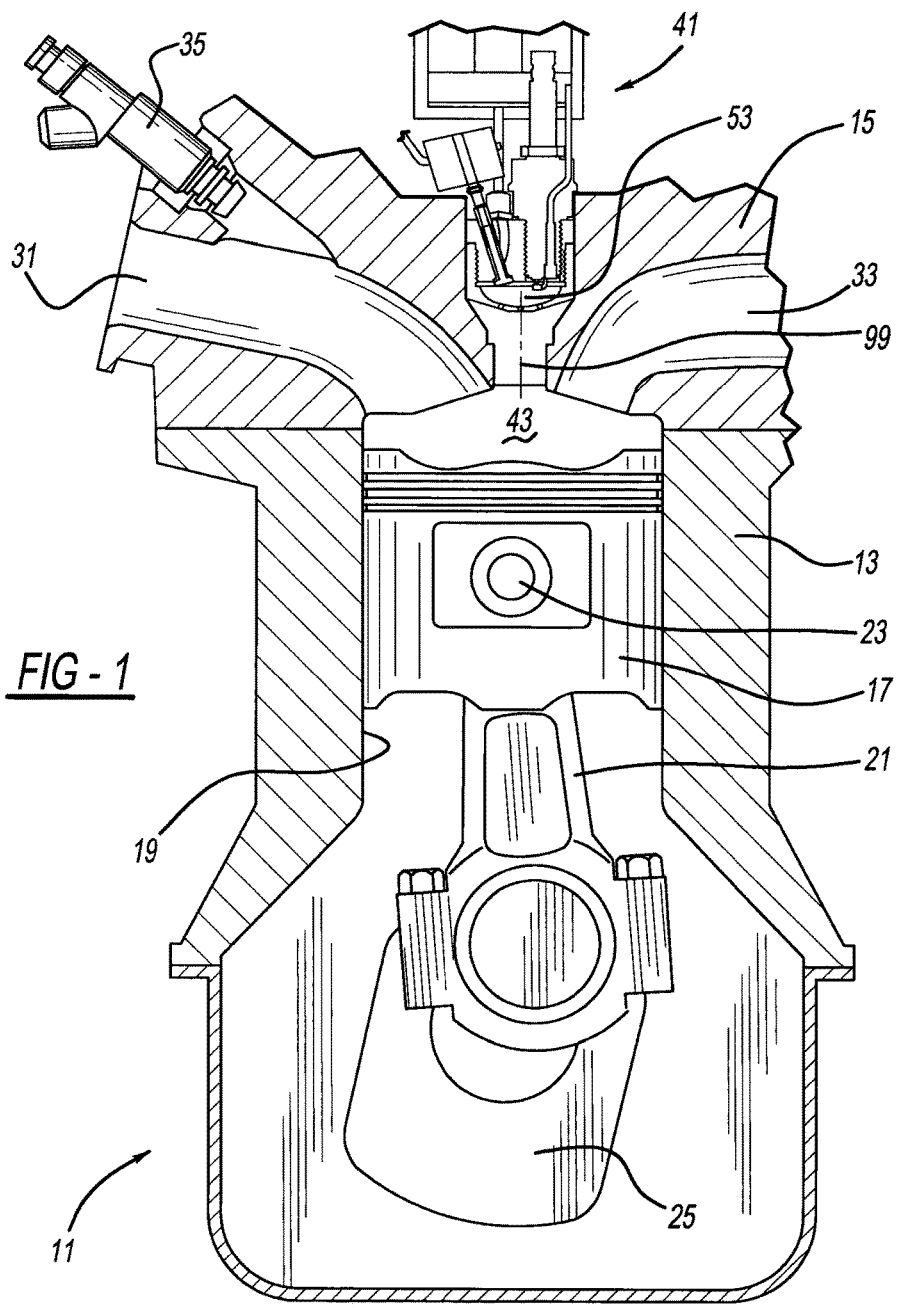
FIG. 1 is a cross-sectional view showing a first embodiment of an internal combustion engine of the present invention.

Referring to FIG. 1, an internal combustion engine 11 of an automotive vehicle includes an engine block 13 and a cylinder head 15 mounted thereto. A main driving piston 17 operably advances and retracts within a cylinder cavity 19 in order to drive a connecting rod 21 spanning between a pin 23 of piston 17 and a crank shaft 25. Furthermore, cylinder head 15 includes an intake manifold 31, an exhaust manifold 33, a direct (not shown) or port fuel injector 35 and a first embodiment turbulent jet ignition system 41. A main combustion chamber 43 is located above main piston 17 partially within cylinder cavity 19 and cylinder head 15, directly below turbulent jet ignition system 41.

Referring now to FIGS. 2 and 3, the first embodiment turbulent jet ignition system 41 includes a cup-shaped housing 51 which internally defines the pre-chamber 53 therein. Housing 51 is secured to cylinder head 15 and a cap 54 is in threaded engagement with an upper section of the housing. At least one and more preferably three to ten apertures 55 are always open and connect pre-chamber 53 to main combustion chamber 43. Each aperture is approximately 1 mm in diameter. Turbulent jet ignition system 41 further includes an igniter 61, such as a spark plug, glow plug or the like, which has an end 63 located within pre-chamber 53 for providing a spark or other heat ignition source for a fuel-rich, fuel-air mixture within pre-chamber 53. As used herein, "rich" means the actual fuel to air ratio is greater than stoicheometric, and "lean" is less than the stoicheometric fuel to air ratio.

Additionally, turbulent jet ignition system 41 includes a supplemental piston 65 which moves within a piston housing 67 in response to hydraulic or pneumatic fluid flowing into an inlet port 69 and exiting an outlet port 71. A biasing compression spring 73 is employed to retract piston 65 when the fluid actuating pressure is removed. Furthermore, a supply valve 75 is connected to a passageway 77 adjacent a bottom of piston housing 67 to operably allow the rich fuel-air mixture into a supplemental piston cavity for subsequent pushing of piston 65 outwardly through a conduit 77. Conduit 77 connects a bottom of supplemental piston housing 67 to an intermediate portion of a poppet valve passageway 79 via a connecting conduit 81 in the cap. A poppet valve 83 retracts to a nominal position by way of a compression spring 85 and advances when an electro-magnetically operated solenoid 87 is energized. When energized, solenoid 87 causes poppet valve 83 to open which thereby allows the piston-pressurized and rich fuel-air charge to flow from supplemental piston housing 67 into pre-chamber 53 for ignition therein.

A first pressure transducer 91 is partially located within or is otherwise accessible to pre-chamber 53 for sensing internal pressure therein and a second pressure transducer 93 is partially located within or is otherwise accessible to main combustion chamber 43 for sensing an internal pressure therein. Transducers 91 and 93 are electrically connected to an electronic controller 95, such as a programmable engine computer having a micro-processor, and non-transient computer ROM or RAM memory, capable of storing and running software including various programmed instructions.

Controller 95 has programmed instructions automatically controlling pressure within turbulent jet ignition pre-chamber 53 by causing movement of supplemental piston 65 and energization of solenoid 87 to open or close poppet valve 83. Furthermore, controller has programmed instructions which cause igniter 61 to create a spark for igniting the rich fuel-air charge in pressurized pre-chamber 53. Moreover, controller 95 has programmed instructions receiving signals indicative of the sensed pressure in pre-chamber 53 via transducer 91 and main combustion chamber 43 via transducer 93. The controller thereafter automatically adjusts the pressure in pre-chamber 53, through piston 65 and valve 83 actuation, in a closed-loop manner for a subsequent cycle based at least on part on the sensed pressure signals. Moreover, the controller has additional programming instructions causing a fuel-air charge to be emitted into the pre-chamber at 0.95λ or richer, and the fuel-lean main fuel-air mixture to be injected into the main combustion chamber at a ratio of 1.0λ or leaner. λ=1 indicates a stoichiometric fuel-air mixture. The controller will automatically calculate and vary pre-chamber pressure, fuel quantity and ignition timing based on the sensed pressure signals, but also at least partly based on throttle positioning/signals, engine temperature, air temperature and the like.

The fuel-air mixture is mixed prior to entry into piston housing 67 which supplies pre-chamber 53. It is noteworthy that piston 65 controls the fuel-air charge pressure in pre-chamber 53 so that the pre-chamber internal pressure matches that of the main combustion chamber to reduce if not eliminate gas flow or backfeeding between the two chambers during compression of driving piston 17 in order to maintain the desired fuel-air ratio in the pre-chamber prior to spark ignition therein. Piston 65 pressurizes pre-chamber 53 on a continuous basis during the compression stroke of the driving piston of the engine. It is preferred that the internal pre-chamber pressure be the same as or up to 5% greater than that of the main combustion chamber, at least prior to ignition in the main combustion chamber. This pre-chamber pressurization methodology prevents uneven burning in the pre-chamber due to the added piston-supplied air since supplemental piston 65 is supplying a mixed fuel-air charge and not simply only air or only fuel. The pre-chamber ionization signal, along with the pre-chamber pressure signal, during the pre-chamber combustion period, is used to achieve the desired pre-chamber heat release rate delivery to the main chamber by the turbulent jet ignition system 41 by adjusting the dwell current of spark plug igniter 61, and the pressure of the trapped fuel-air mixture in pre-chamber 53.

A charge of an oxidizer, such as air, in the engine main chamber is regulated using the engine throttle and intake valve timing. The fuel is also injected into the main combustion chamber 43 either through port fuel injection or direct injection. No spark plug is required for main combustion chamber since the lean fuel-air mixture in main combustion chamber 43 is ignited by the previously ignited fuel-air charge pushed through apertures 55 from the higher pressure pre-chamber 53.

Figure 5:
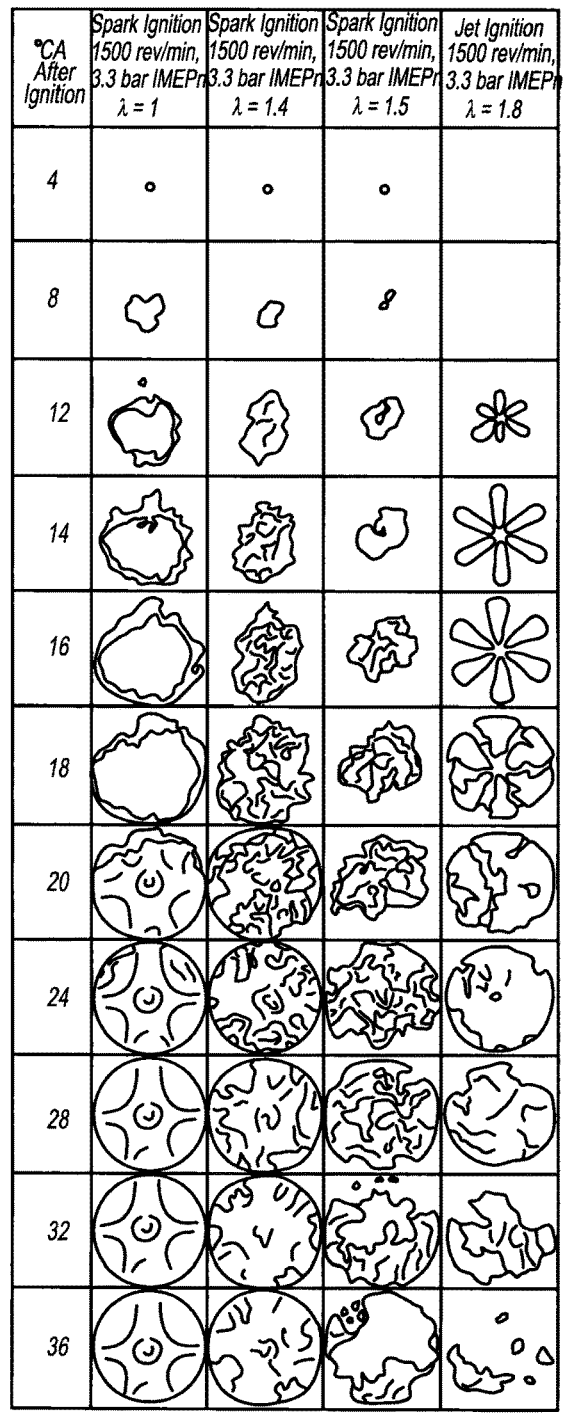
FIG. 5 is a chart showing expected ignition results in different operating conditions for the first embodiment internal combustion engine.

The present internal combustion engine and turbulent jet ignition system can use a variety of fuels such as gasoline, syngas, propane, natural gas, heavy fuel such as diesel, and the like. While the fuel-air mixture in the main combustion chamber can be near stoichiometric, for efficiency and emission control, it is more advantageous to employ a leaner mixture up to 2λ or even greater than 3.0λ (for propane and gasoline depending on the engine). The present turbulent jet ignition system improves flame propogation in lean mixtures, thereby promoting controlled burning, improving fuel efficiency, and reducing NOx emissions. FIG. 5 illustrates the expected combustion propogation of spark ignition and jet ignition at different crank angles ("° CA") and different fuel-air ratios, in an exemplary 1500 revolutions/minute and 3.3 bar IMEPn, operating condition. More complete lean fuel-air combustion is expected in the main combustion chamber using turbulent jet ignition of the present system as compared to prior attempted devices.

It is noteworthy that the pre-chamber is preferably of a constant volume, and not functionally changed by supplemental piston movement or the like, for all of the embodiments disclosed in this application. Furthermore, in one exemplary construction the centerline 99 of pre-chamber 53 and centerline 99 of central aperture 55C exiting the pre-chamber are coaxially aligned with centerline 99 of main driving piston 17, which linearly advances and retracts towards and away from the pre-chamber, as can be observed in FIGS. 1 and 3. This advantageously allows ejection of the ignition jet in a uniform manner from the pre-chamber into the region between the piston head surface facing the pre-chamber and the cylinder deck such that ignition in the main piston chamber is uniformly applied upon the piston head surface. But other constructions do not require such centerline alignment, for packaging reasons.

The embodiments shown in FIGS. 6-15 provide a turbulent jet ignition system and method where the fuel and air stoichiometry is electronically controlled and mixing takes place in the pre-chamber. This system will allow the software instructions of the programmable controller to control the amount of fuel, fresh air and diluent in the pre-chamber from the previous combustion cycle. High pressure fuel (gaseous or liquid) and low-to-high pressure air are separately admitted into the pre-chamber and thereafter mixed in the pre-chamber. Thereafter, the rich air-fuel mixture in the pre-chamber is sparked by the igniter to create a turbulent reacting jet which will ignite a very lean global air-fuel ratio in the main piston chamber.

Figure 6:
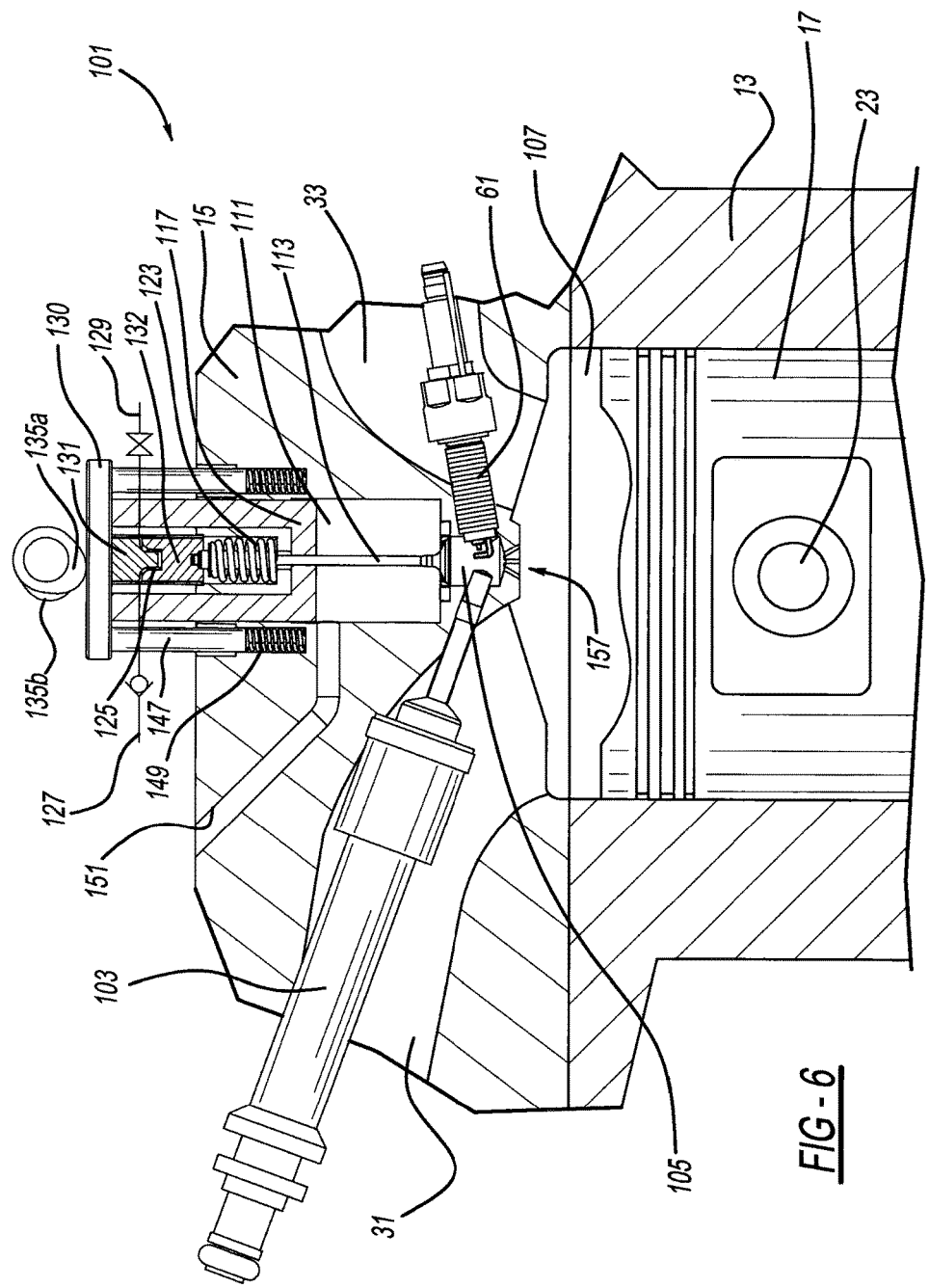
FIG. 6 is a cross-sectional view showing a second embodiment turbulent jet ignition system for an internal combustion engine.
Figure 7:
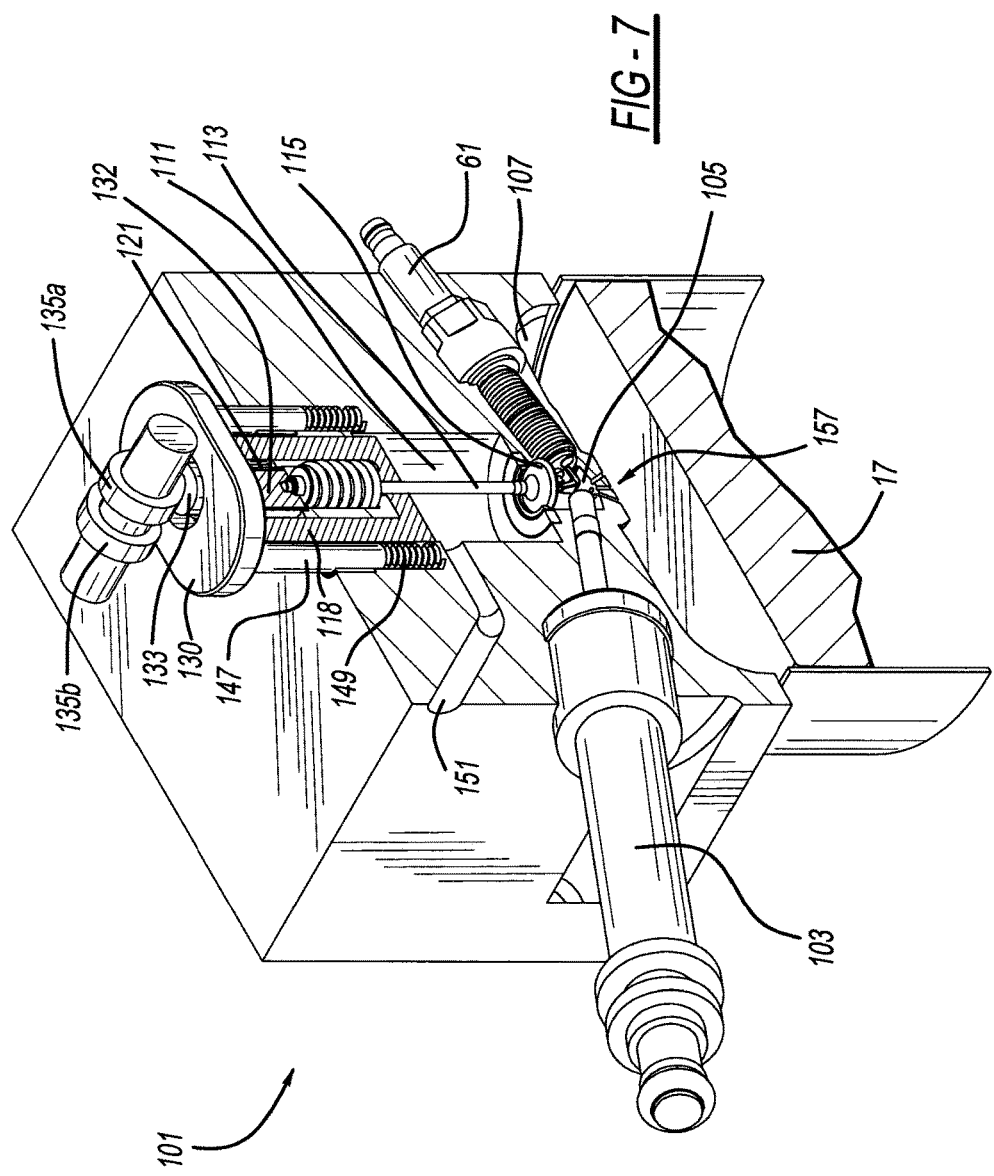
FIG. 7 is a fragmentary perspective view showing the second embodiment turbulent jet ignition system for the internal combustion engine.
Figure 8:
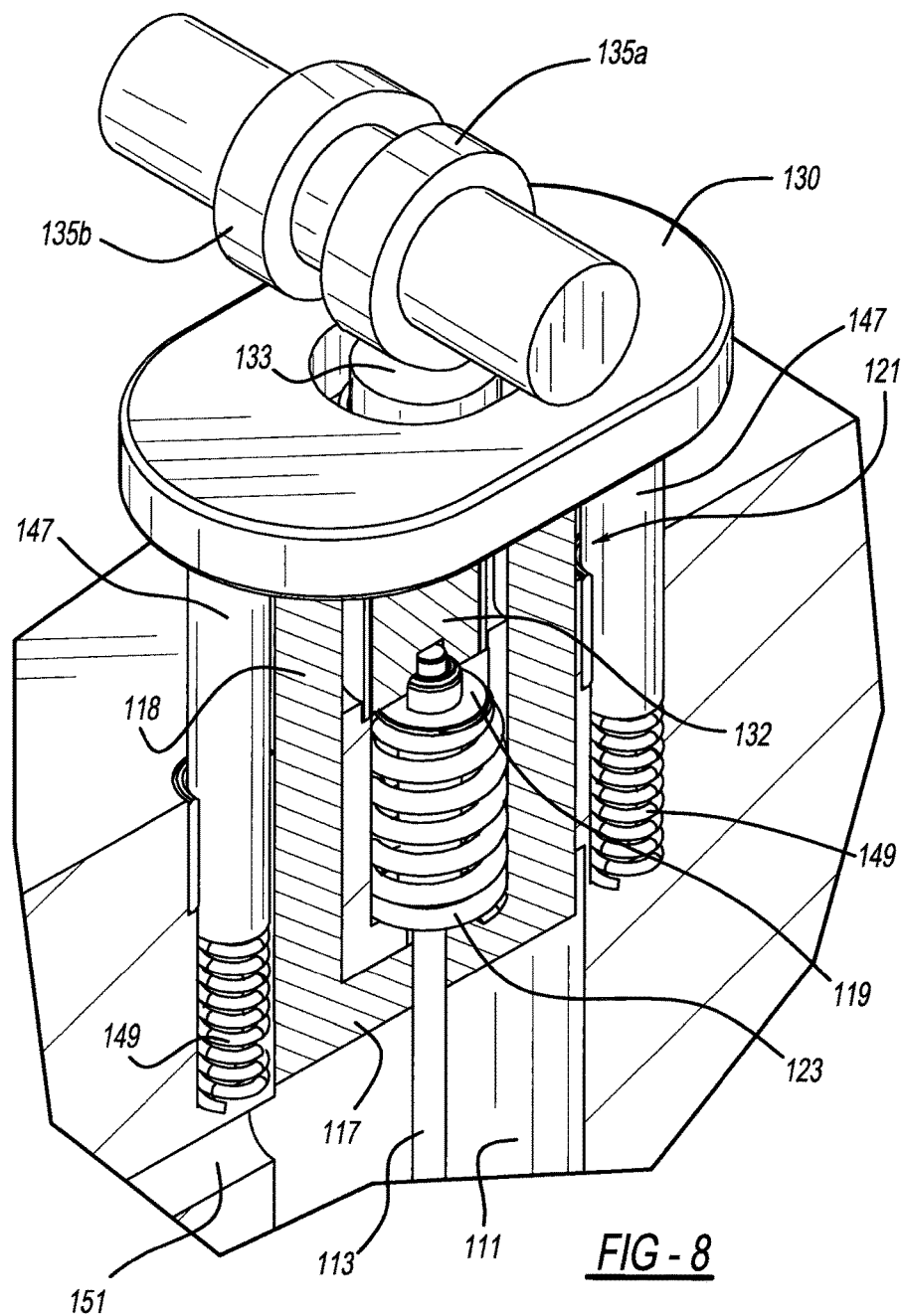
FIG. 8 is an enlarged perspective view showing a portion of the second embodiment turbulent jet ignition system for the internal combustion engine.

More specifically, FIGS. 6-8 show a variant of the turbulent jet ignition system 101 and method that employ a fuel injector 103 which directs fuel toward an air shear stream from an in-line air pump mechanism 111, but which are not premixed prior to a pre-chamber 105. The purpose is to create a relatively rich, near homogeneous air-fuel mixture in the pre-chamber, providing high levels of turbulence for good mixing and a fresh air charge to purge the products of combustion in the pre-chamber from the previous cycle, whether they were present from combustion in the pre-chamber or were driven into the pre-chamber from high pressure gas in a main piston cylinder chamber 107.

Purge pump 111 has a cylindrical housing and is coaxially connected to a top of pre-chamber 105 via a valve controlled air inlet port 151. An elongated valve stem 113 is coaxially aligned with and linearly moveable along a centerline of purge pump 111 and pre-chamber 105, such that a laterally enlarged and tapered plug or head 115 attached to stem 113 selectively opens and closes the air inlet port. Stem 113 and head 115 act as a controllable poppet valve activated by a cam 135a. A supplemental piston head 117 is slidable up and down relative to a middle section of stem 113, which extends therethrough, for linear movement therewith inside purge pump 111. A cylindrical upstanding side wall 118 is affixed to a periphery of supplemental piston 117, an upper edge of which is affixed to and moveable with an oval shaped plate 130. Posts 147 downwardly project from plate 131 outboard and parallel to side wall 118, and compression springs 149 upwardly bias the supplemental piston assembly to the retracted position shown in FIG. 8. Purge pump 111 has an internal volume of approximately 5 to 25 times an internal volume of pre-chamber 105.

Figure 4:
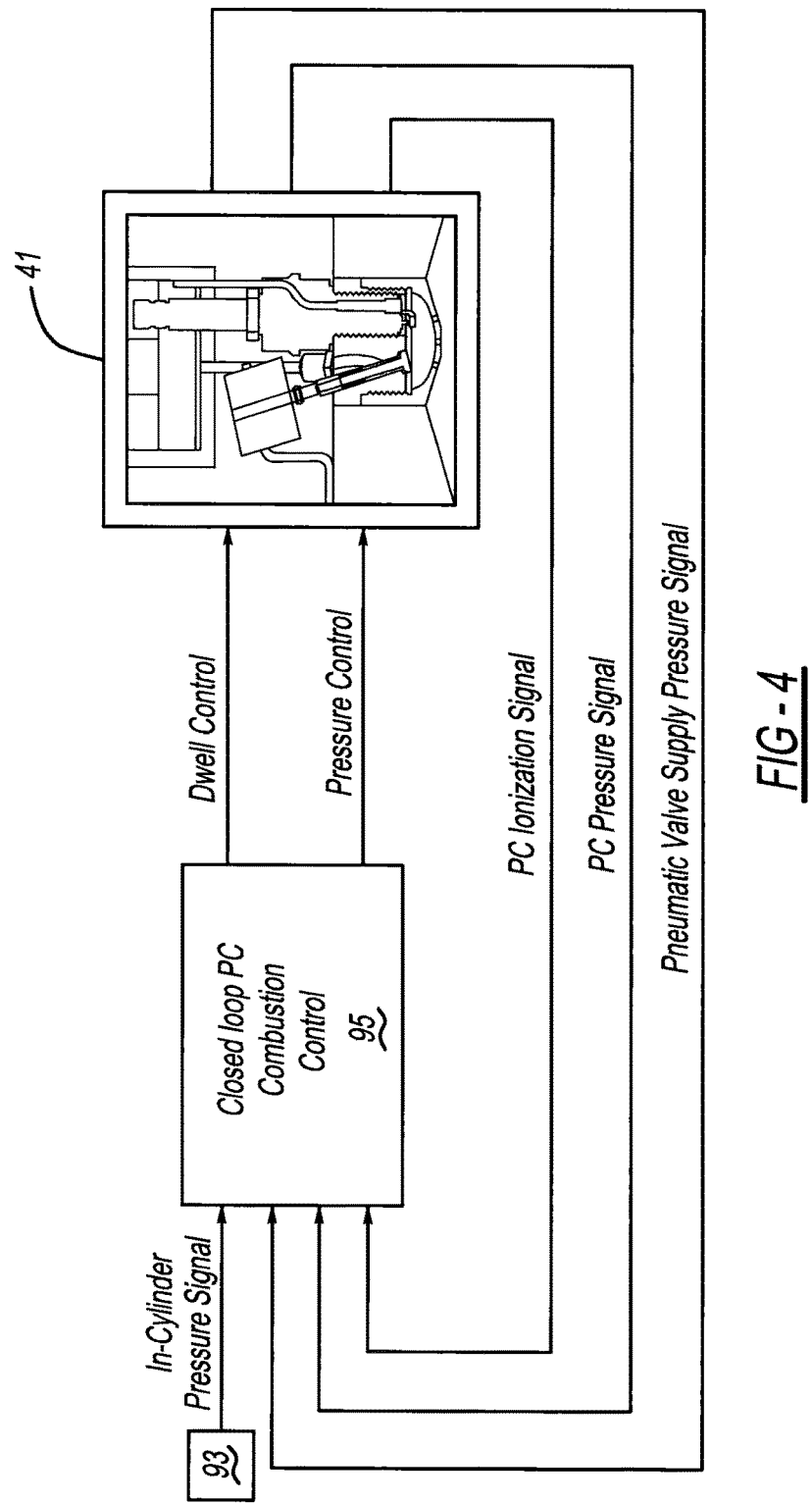
FIG. 4 is a schematic view showing an electrical control system for the first embodiment turbulent jet ignition system of the internal combustion engine.

An upper end of stem 113 is attached to a lower plunger half 132 which is moveably located inside a cylindrical casing or bore 121 located adjacent a top of purge pump 111 opposite pre-chamber 105. A compression spring 123 is located between a disk 119, attached to an upper end of stem 113, and a bottom surface of casing 121 to bias valve head 115 toward a closed position blocking air from flowing from purge pump 113 to pre-chamber 105. An upper section of casing 121 further includes an oil fluid aperture 125 internally located therein connected to an engine oil inflow line 127 and ball-check valve and an engine oil outflow line 129 and valve, operating at approximately 60 psi. Thus, the oil flows through passage 125 between an upper plunger half 131 and lower plunger half 132 selectively applying pressure thereagainst in a hydraulic tappet manner to move valve 115 in a variable manner controlled by the programmable engine controller 95 (see FIG. 4).

A follower surface is at an exposed distal end of upper plunger half 131. An offset cam lobe surface 135a, rotating about a cam shaft 137 (driven by driving crank shaft 25, see FIG. 1), intermittently pushes against then releases plunger surface 133, which causes linear advancing of plunger halves 131 and 132. This, in turn, opens and closes valve head 115 of purge pump 111 which provides variable air valve timing through a lost motion-type of arrangement. Furthermore, the air valve is quickly released near TDC if cam timing is insufficiently rapid. Meanwhile, when cam surface 135b is rotated to contact against plate 130, plate 130 and supplemental piston 117 are advanced. This compresses the air within purge pump so the fresh air can be injected through the open valve port into the pre-chamber 105. The offset two cam lobe example shown is advantageous for independent control of the valve and purge pump piston. The cam-driven approach also advantageously requires minimal energy consumption to drive the purge pump and is very durable. Additional or alternative mechanical valve and supplemental piston actuation may be employed, such as with linkages, levers, rods and/or cams Pressurized fresh air enters purge pump 111 via inlet conduit 151. It is pressurized by a turbocharger compressor, a separate pump or manifold pressure. Less preferably, it can be at atmospheric pressure.

Figure 9:
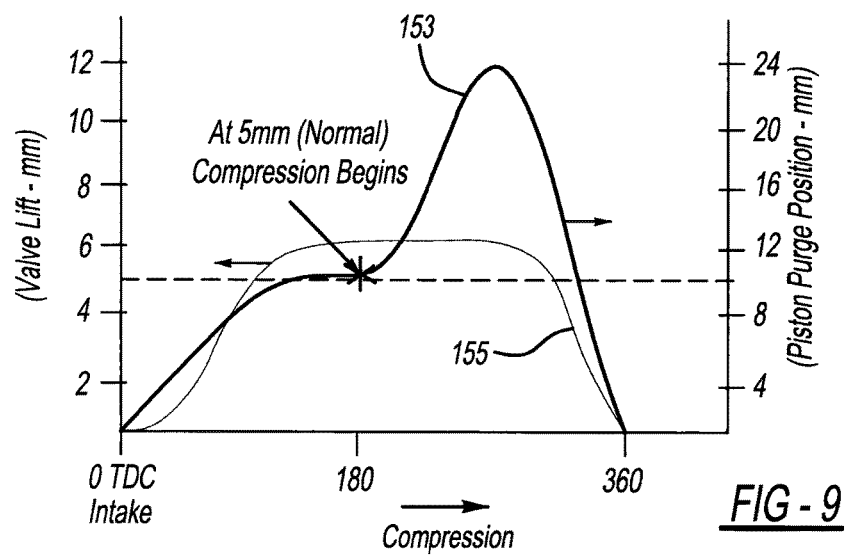
FIG. 9 is a graph of expected pre-chamber valve and purge piston lift profile results using the second embodiment turbulent jet ignition system for the internal combustion engine.

FIG. 9 shows a position of the purge piston as a first line 153 and a position of the purge pump valve versus crank shaft angle as a second line 155. Intake is roughly 1 to 180° and compression is roughly 180° to 360°, depending on the engine construction. In other words, the purge pump uses the fresh air to purge the pre-chamber during an intake stroke of main driving piston 17 as the energy required to perform this function will be minimal. During compression, pressure is increased in the pre-chamber to prevent backflow from the main drive cylinder to reduce the chance of residuals from entering the pre-chamber, since such will inhibit good combustion control in the pre-chamber. As the pressure in the pre-chamber is increased during compression by the primary drive piston, the pressure in the pre-chamber is increased to keep the pressure therein greater than the main driving cylinder pressure.

Returning to FIGS. 6-8, fuel injector 103 has an end port located within pre-chamber 105 at a separate diagonally offset location from the air entry port of purge pump 111. Fuel injector 103 is very accurate and preferably injects liquid fuel particles at a nominal size of approximately 10-20 microns, with a penetration range of approximately 5-20 mm, and having an adjustable fuel delivery rate of approximately 0.1 to 5.0 mg in units of about 0.1 mg/0.1 ms, depending on the engine configuration. Exemplary fuel injectors are disclosed in U.S. Patent Publication Nos. 2014/0373806 entitled "Fuel Injector for Multi-Fuel Injection with Pressure Intensification and a Variable Orifice" and 2013/0213358 entitled "Fuel Injector Capable of Dual Fuel Injection," which are both incorporated by reference herein. A spark plug or glow plug igniter 61 has its igniting end directly located in pre-chamber 105 between the air port of purge pump 111 and combustion exit apertures 157 of the pre-chamber. An elongated centerline axis of igniter 61 is diagonally oriented relative to a coaxial centerline through the air valve stem, purge pump, pre-chamber and main driving piston, and on an opposite side of the centerline from the fuel injector. It should be appreciated that tappets, rockers, lifters, pushrods and other such mechanisms may alternately be used to mechanically drive the purge pump air valve based on crank shaft positioning.

Figure 10:
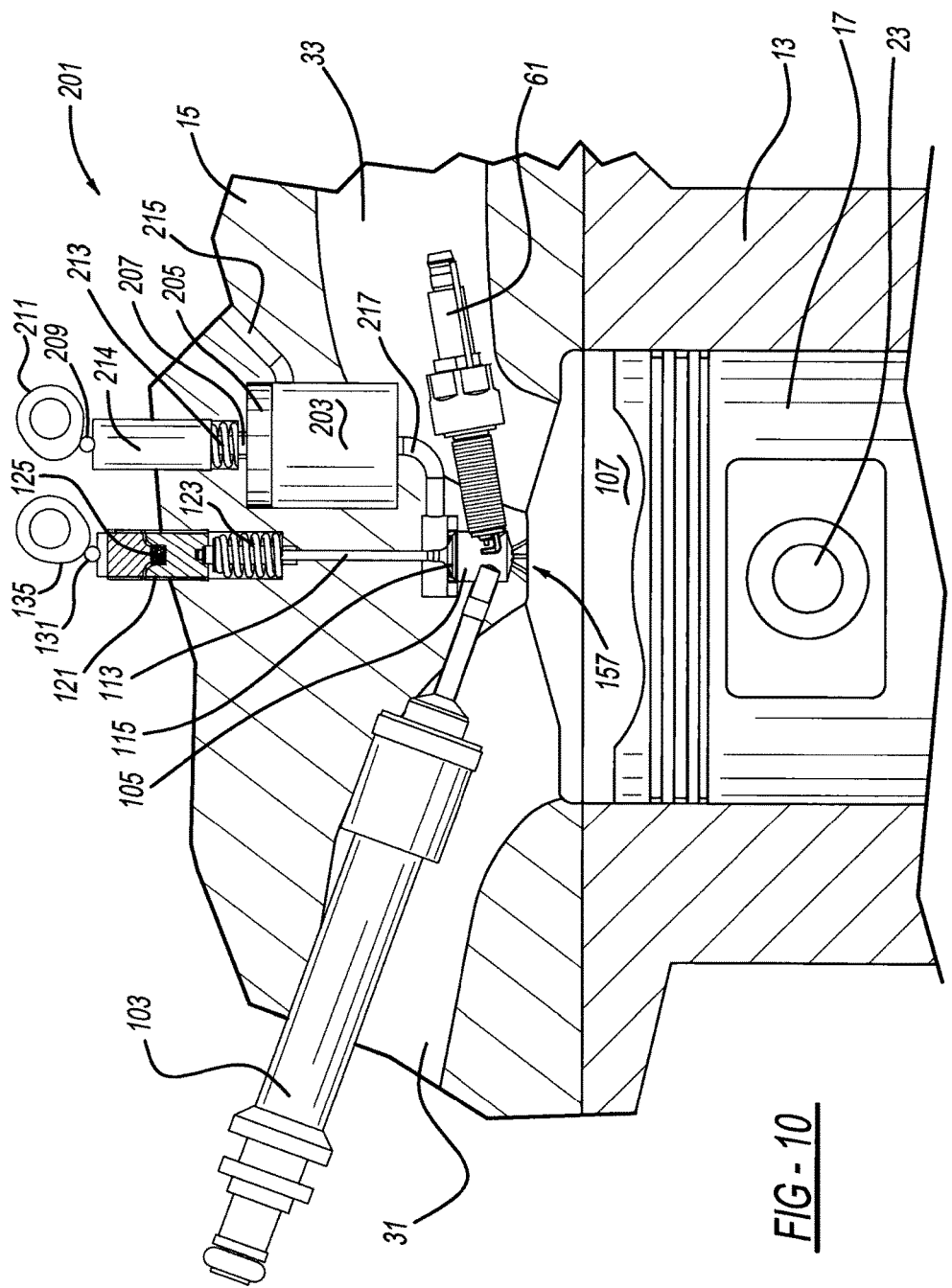
FIG. 10 is a cross-sectional view showing a third embodiment turbulent jet ignition system for an internal combustion engine.
Figure 11:
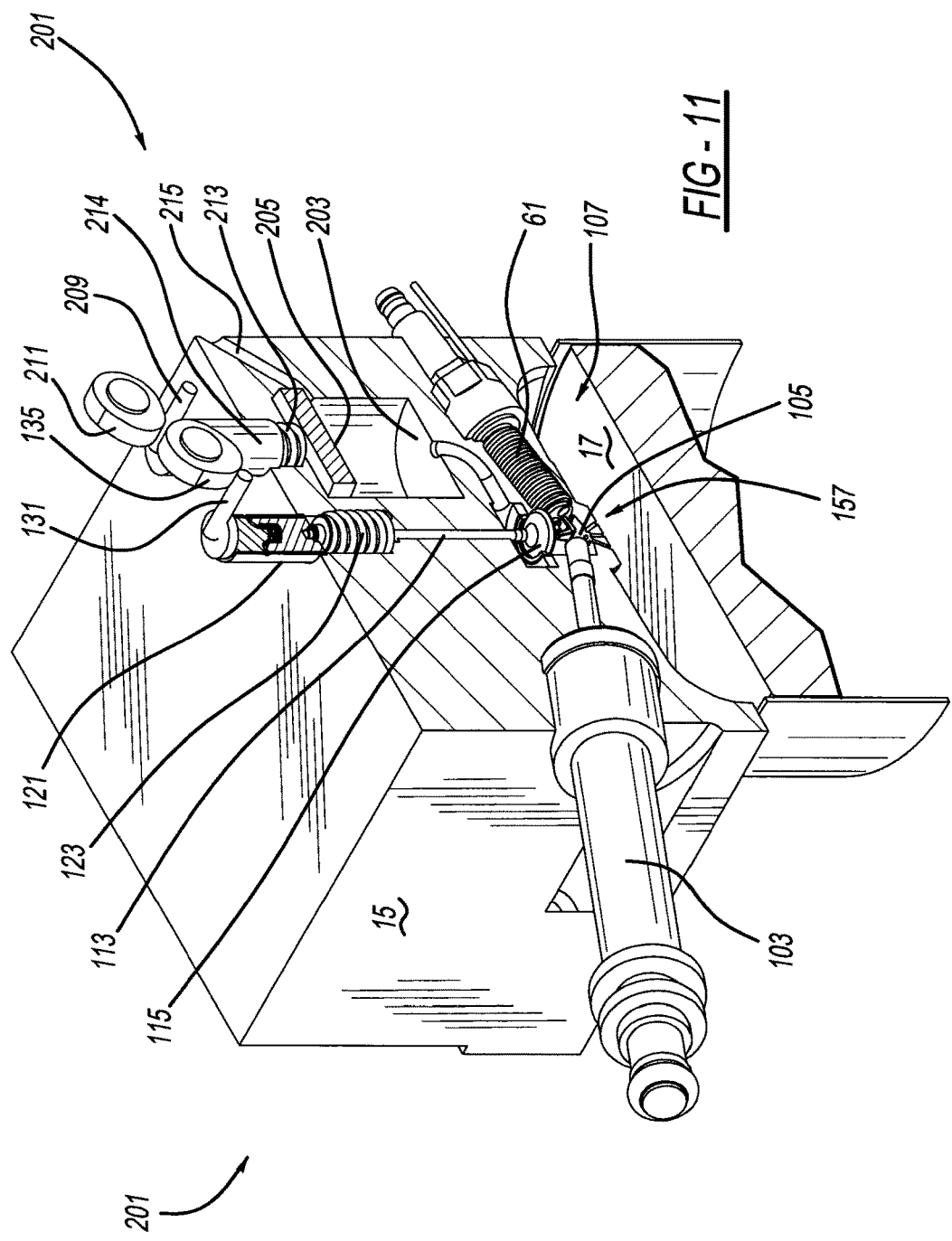
FIG. 11 is a fragmentary perspective view showing the third embodiment turbulent jet ignition system for the internal combustion engine.
Figure 14:
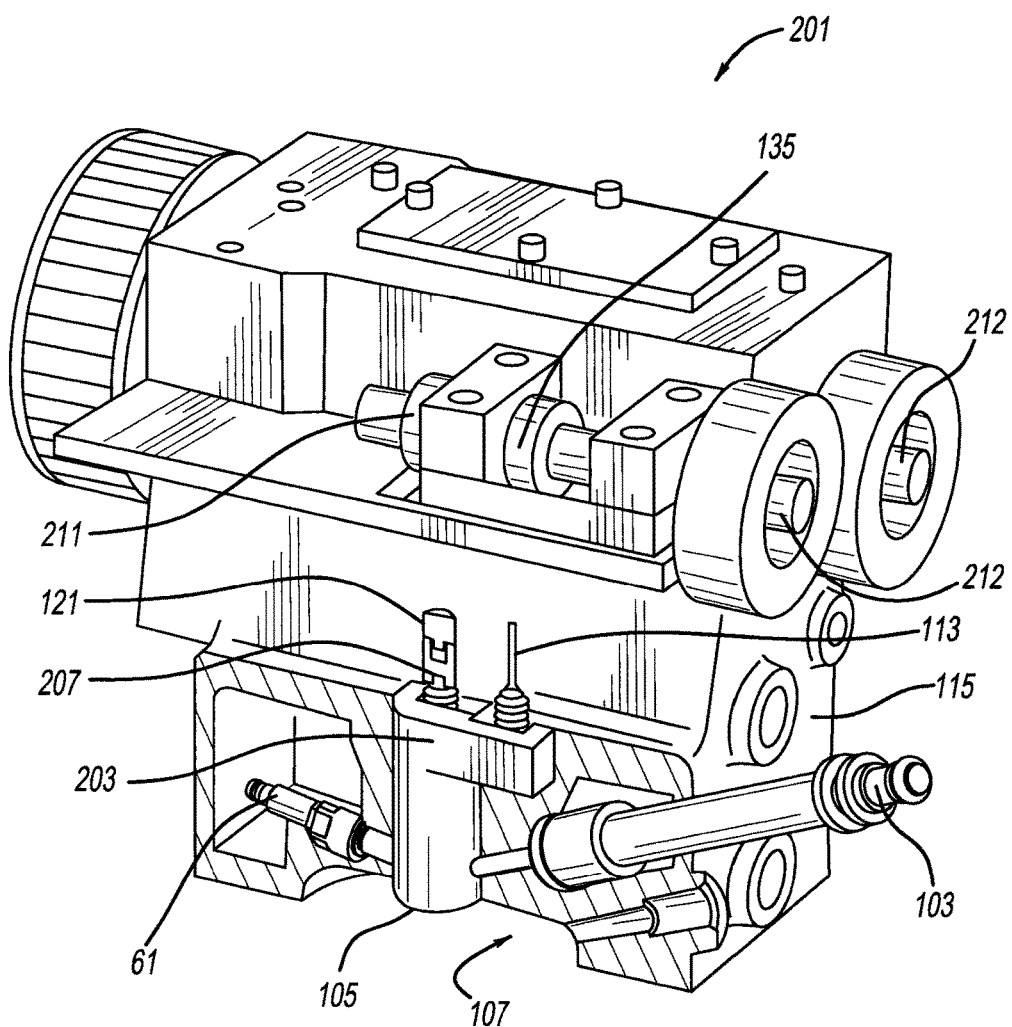
FIG. 14 is a fragmentary perspective view showing the third embodiment turbulent jet ignition system for the internal combustion engine.

Referring to FIGS. 10, 11 and 14, another embodiment turbulent jet ignition system 201 is shown. Fuel injector 103, igniter 61, pre-chamber 105 and main driving piston 17 are the same as in the FIG. 6 embodiment. The present embodiment, however, provides a parallel purge pump and air valve arrangement which allows for independent control of each. Valve stem 113, head 115, spring 123, plunger halves, cam lobes 135, follower 131 and oil casing 121, are like that in the FIG. 6 embodiment. But, the positioning of an air purge pump 203 differs. Air purge pump 203 employs a supplemental piston head 205 in a housing thereof which is linearly advanced and retracted by a piston rod 207 coupled to another cam-follower shaft surface 209, with an oil casing coupled therebetween. Another cam lobe surface 211 intermittently actuates the purge pump. Surfaces 135 and 211 are rotated by dual overhead cams 212 on a shaft. A parallel arrangement utilizing a single cam with lobes which are timed to manage the air valve and purge pump are also envisioned. Cam surface 211 selectively pushes against follower surface 209 while rotating, which advances a plunger and piston rod 207 against the biasing of another compression spring 213. This causes air that entered the purge pump chamber via inlet 215 to be pushed through outlet passageway 217. When valve head 115 is opened then the fresh air will enter pre-chamber 105 during and/or in advance of the fuel entering pre-chamber 105 from fuel injector 103. This parallel air arrangement provides an accurate and adjustable timing control of air entry within the engine cycle. Furthermore, this parallel construction achieves a more flexible or different packaging space within engine block 13 and cylinder head 15, as compared to the in-line construction of FIG. 6.

This construction advantageously consumes minimal engine energy to drive the pre-chamber fuel and air injection. Moreover, the large air flow area provided by poppet valve 115 creates less flow resistance than small orifices in a single injector. Thus, less work is required to purge the pre-chamber due to lower unrestrained expansion than would be present in a high pressure injector with small orifices. It should alternately be appreciated that the centerline of purge pump 203 and oil casing 214 may be angularly offset from a centerline of valve stem 113 and oil casing 121.

Figure 12:
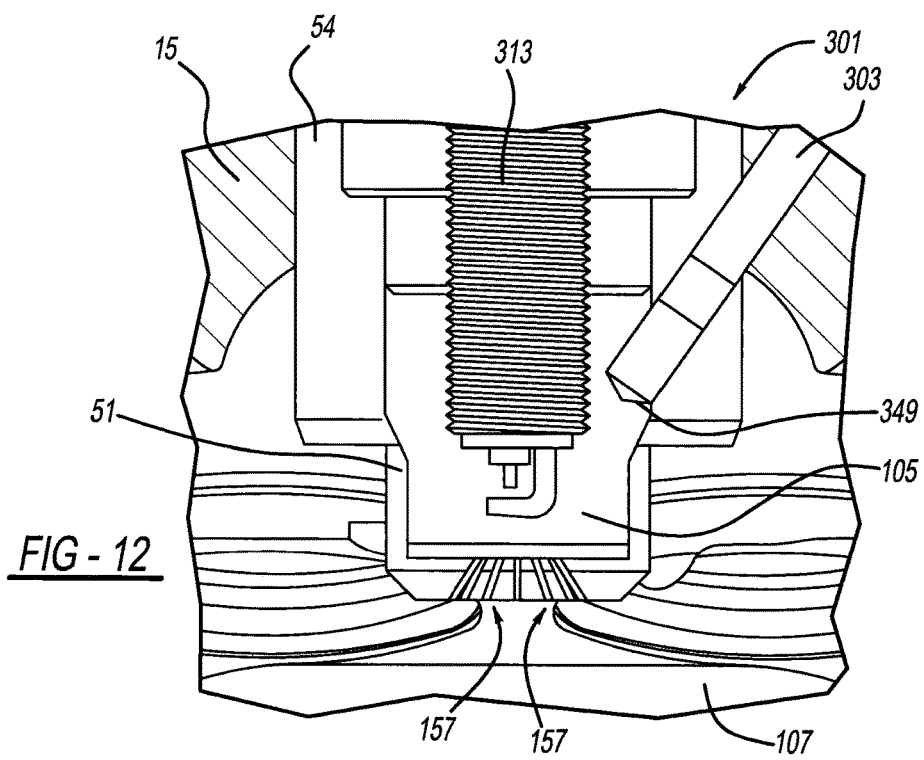
FIG. 12 is a cross-sectional view showing a fourth embodiment turbulent jet ignition system for an internal combustion engine.
Figure 13:
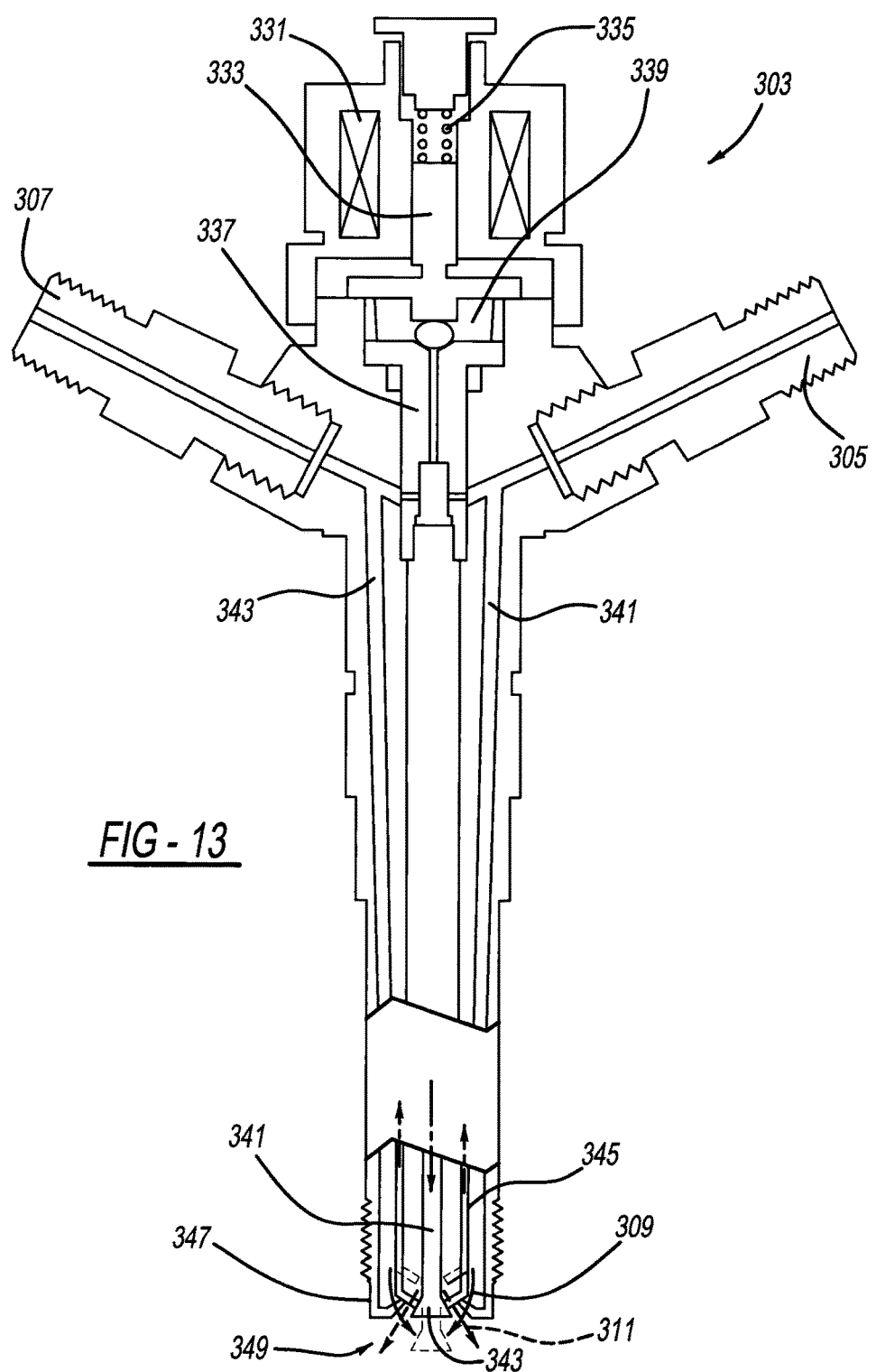
FIG. 13 is a cross-sectional diagrammatic view showing a dual-nozzle air-fuel injector used with the fourth embodiment turbulent jet ignition system for the internal combustion engine.

FIGS. 12 and 13 illustrate another variant using a dual-mode turbulent jet ignition system 301 where a single injector assembly 303 contains the elements of both a fuel injector and an air injector in a single unit. This includes a fuel supply inlet fitting 305 and an air supply inlet fitting 307 and can supply fuel 309 and air 311 separately to pre-chamber 105 and does it in a beneficial manner such that mixing is enhanced, the fuel-air mixture near igniter 313 is controlled and more easily ignitable, and single injector unit 303 delivering both fuel and air is designed in such a manner that one delivery system can act and be controlled (timing and quantity) independently of the other. Furthermore, single injector unit 303 requires much smaller packaging space within the engine.

An electromagnetic actuator, such as a solenoid 331, operably moves a plunger valve 333 when energized, acting against a biasing compression spring 335. A pressure intensifier plunger 337 and chamber 339 may optionally be included. In the version illustrated, plunger 337 initially advances a valve stem 341 and tapered valve plug or head 343 to provide a gap at a valve seat between it and an interior of the adjacent frustoconically tapered distal end of an air conduit 345, through which air 311 exits injector unit 303. Further advancing motion of plunger 337, or alternately full retraction of plunger 337, causes air conduit 345 to retract toward solenoid 331. This provides a gap between an outer surface of air conduit 345 and an inner backwardly angled edge of a fuel conduit 347. Air conduit 345 is concentrically located within fuel conduit 347. Air 311 is injected prior to fuel 309 and the surface angles at the outlet gaps at distal end 349 of injector unit 303 cause the air and fuel flow directions to cross thereby thoroughly mixing them when the flows are simultaneous, and increasing turbulent mixing even during sequential exiting. Alternately, plunger 337 selectively seals or opens internal passageways such as in a sequentially or offset oriented manner to initially allow seperally channeled flows of air 311 then fuel 309.

Figure 15:
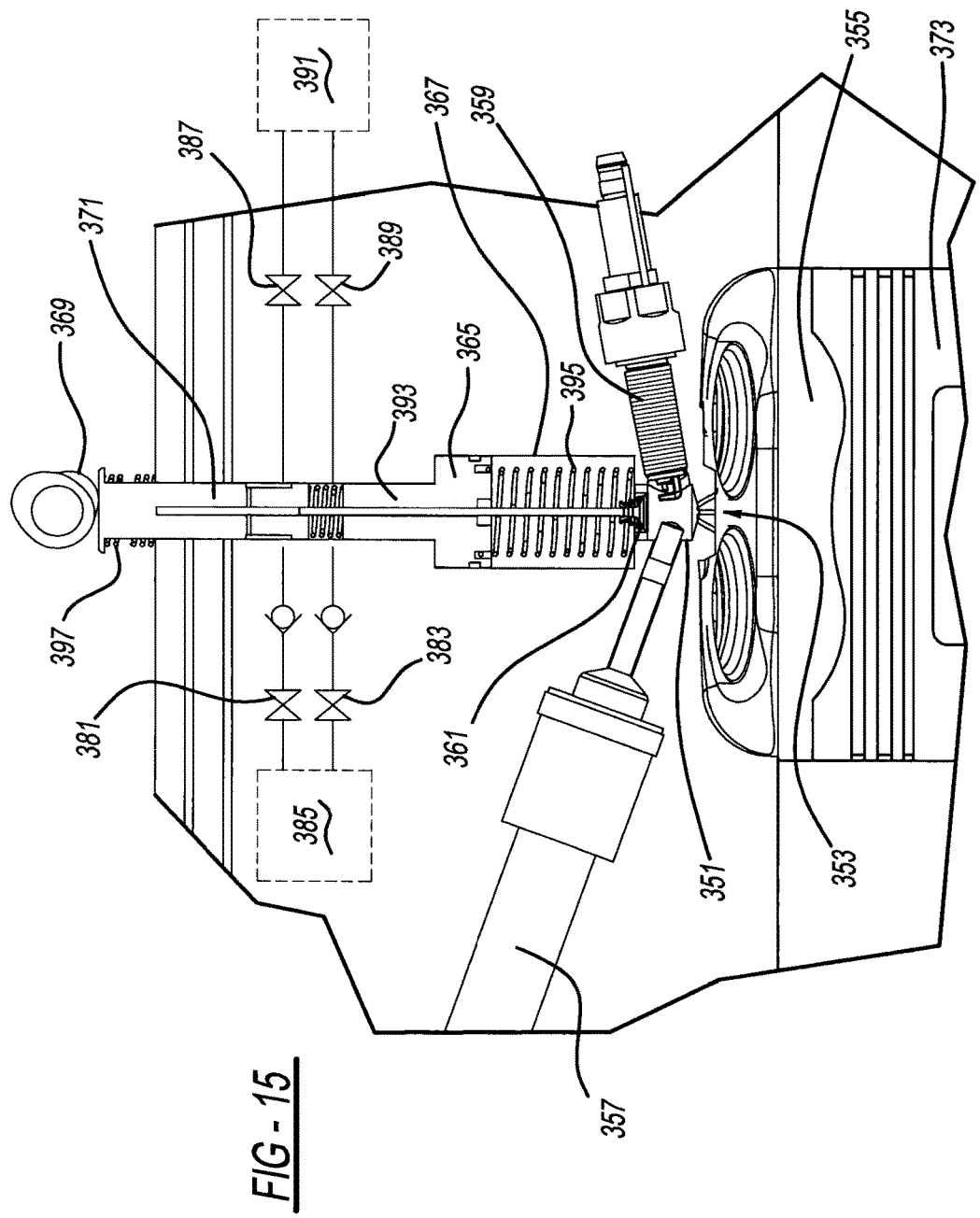
FIG. 15 is a diagrammatic elevational view showing a fifth embodiment turbulent jet ignition system for the internal combustion engine.

A fluid controlled embodiment of a turbulent jet ignition arrangement is illustrated in FIG. 15. A pre-chamber 351 includes multiple apertures 353 leading to a main combustion chamber 355. A tip of a fuel injector 357 and a tip of an igniter 359 are located in pre-chamber 351. A head of an air poppet valve 361 and associated port operate to selectively allow fresh air to flow from a chamber 365 of a purge pump 367 into pre-chamber 351. A lobe surface of a rotating cam 369 periodically pushes against a top surface of an upper plunger 371.

TDC intake is at 0 crank angle degrees. From crank angle θ to approximately 50 degrees, the camshaft allows poppet valve 361 to lift approximately 5 mm, until the valve reaches a stop near the port entrance to the pre-chamber. Valve 361 is held at this position during the intake stroke of a main driving piston 373 and closed just before the start of ignition in the pre-chamber at the latest. During the first 180 crank angle degrees, a first oil valve 381, receiving oil fed from an oil sump or tank, is open and a second oil valve 383 is closed. Also, at the same time the above actions are taken for valves 381 and 383, a third oil valve 387 is closed and a fourth oil valve 389 is open. Oil valves 387 and 389 are connected to an oil return tank. This allows the air valve 361 to the pre-chamber to be open while a purge piston 393 remains stationary.

At approximately 180 crank angle degrees (which is the start of compression in main combustion chamber 355), oil valve 389 is closed and oil valve 383 is opened. This causes the lower purging piston 393 to linearly move downward against a biasing compression spring 395 as cam 369 rotates. At the same time oil valve 389 is closed and oil valve 383 is opened, oil valve 381 is closed and oil valve 387 is partially opened to maintain a holding pressure on the pre-chamber air valve 361 (holding it at approximately 5 mm).

From approximately 180 degrees to near the start of combustion in the pre-chamber, cam 369 continues to move purging piston 393 down toward pre-chamber 351, maintaining a pressure slightly greater than the pressure in main combustion chamber 355. Near the spark event from igniter 359, oil valve 381 is closed and oil valve 387 is opened, allowing another biasing compression spring 397 to close air valve 361 to the pre-chamber. Oil valve 383 is closed and oil valve 389 is opened, allowing biasing spring 395 to move purge piston 393 to the top of its cylindrical housing or casing. Total cam lift is expected to be approximately 30 mm. The assembly is then ready to be repeated for the next cycle. It is noteworthy that managing the timing of the oil valves allows the controller to manage the fresh charge mass delivered to the pre-chamber and thus, the energy delivered to the main chamber for the initiation of primary combustion and the rate of combustion in the main chamber.

It is expected that all of the FIG. 6-15 embodiments will achieve a brake efficiency performance greater than 40% at low and medium loads and speeds (as compared to approximately 31% brake efficiency at partial load for prior light duty vehicle engines). Thus, the present embodiment has the potential of saving 2.4 million barrels of oil per day if implemented across the entire U.S. light duty truck fleet.

The FIG. 6-15 embodiments are advantageous over premixed fuel and air injection systems as follows:

1. Air and fuel are supplied to the pre-chamber independently of each other. This has the advantage of controlling the location of a combustible mixture within the combustion chambers and reduces if not eliminates the possibility of backfires.
2. Air and fuel are delivered in a manner to obtain maximum mixing in the pre-chamber thereby promoting high levels of evaporation for liquid fuels and good mixing with air for liquid and gaseous fuels. The air and fuel jets can be coaxial swirling, opposed jet or other configurations which promote high levels of turbulence, fuel droplet breakup and fuel evaporation.
3. The present TJI systems will operate from low load to high load by controlling the pressure in the pre-chamber.
4. The present systems can be purged any time during the cycle with fuel, air or a combination of both at any desired air/fuel ratio. Effective purging during the intake stroke would be optimum as this would require the least amount of work, however, with sufficient pressure the pre-chamber could be purged anytime during intake, compression, late in expansion or the exhaust stroke.
5. Separate and controlled delivery of fuel and air to the pre-chamber means that the delivery system can be used to keep the temperature of the pre-chamber below the level that deposit formation of unburned carbon will precipitate on the pre-chamber surfaces, the nozzle and surfaces of the orifice connecting the pre-chamber to the main chamber, thereby providing a pre-chamber cooling function.
6. Separate and local control of the air and fuel delivery system within the pre-chamber promotes operation at main chamber EGR rates exceeding 50%. The pre-chamber mixture is managed in such a way the in the region of the start of ignition the fuel-air mixture at the ignition source can be repeatably ignited by a spark or other energy deposition methods.
7. A common problem that occurs with conventional injectors located in hot combustion chambers is deposit formation. The present dual mode injector, turbulent jet ignition system will be capable of delivering an air charge to the pre-chamber immediately after the engine is turned off. This will drive fuel that has been dripped or remains in the pre-chamber after engine shut-off to be driven from the pre-chamber. This is desirable as the carbon in the fuel can otherwise revert to a solid, thereby plugging the pre-chamber nozzle and making it inoperable.
8. The present dual mode injector, turbulent jet ignition system can also be used to deliver fuel, air or a combination of both to the after-treatment systems if required by controlled operation during the exhaust stroke. This eliminates the need for extra injectors or air delivery systems for after-treatment purposes.

The present dual mode injector, turbulent jet ignition system is expected to achieve main chamber a values as high as 4.5 where the dual mode injector, turbulent jet ignition system is located on the top of the combustion chamber with multiple reacting jets exiting the pre-chamber.

While various features of the present invention have been disclosed, it should be appreciated that other variations may be employed. For example, supplemental piston 65 is illustrated above and aligned with driving piston 17, however, alternate supplemental and driving piston configurations and positions can be employed, although various advantages of the present system may not be realized. Additionally, alternate fuel-air passageways, conduits, and ports may be provided, although some advantages may not be achieved. Additionally, it is envisioned that different types of valves, sensors and actuators may be used, but certain benefits may not be achieved. Alternately, variations in the fuel-air mixture can be used, but performance may suffer. For example, various alternate liquid or gaseous fuels may be used in place of gasoline. Variations are not to be regarded as a departure from the present disclosure, and all such modifications are intended to be included within the scope and spirit of the present invention.

The invention claimed is:
1. An internal combustion engine comprising:
 a pre-chamber including multiple apertures which are always open between the pre-chamber and main combustion chamber;
 a main combustion chamber connected to the pre-chamber via the apertures;
 an igniter operably releasing energy in the pre-chamber;
 at least one injector having an outlet connected to the pre-chamber, the at least one injector supplying fuel separately from air, in an unmixed state, into the pre-chamber;
 the air being injected into the pre-chamber prior to injection of the fuel to purge the pre-chamber of any prior combustion particles;

a first mixture of the air and the fuel combusting in the pre-chamber which thereafter ignites a second fuel air mixture in the main combustion chamber through the apertures; and the pre-chamber having an internal pressure equal to or greater than that of the main combustion chamber at least prior to ignition in the main combustion chamber;

a first cam causing an air valve to move for an air purge pump; and a second cam causing a supplemental piston to move fresh air from the purge pump into the pre-chamber.

2. The engine of claim 1, wherein:

the igniter is at least partially located in the pre-chamber; and an internal hollow volume of the purge pump is at least twice an internal hollow volume of the pre-chamber.

3. The engine of claim 2, further comprising:

a main driving piston linearly moveable within the main combustion chamber and being connected to a crank shaft;

timing of at least the air valve associated with air flow from the purge pump being controlled by movement of the crank shaft.

4. The engine of claim 1, further comprising springs being coaxially aligned with an elongated centerline axis of the purge pump.

5. The engine of claim 1, wherein the purge pump and the pre-chamber are linearly located between the cams and the main combustion chamber.

6. The engine of claim 1, wherein the pre-chamber has a constant volume.

7. The engine of claim 1, further comprising pressure sensors associated with the pre-chamber and main combustion chamber operably sending signals to an electronic controller which uses the signals to automatically control the pressure and combustion timing of a subsequent cycle in the pre-chamber, and to automatically control timing of injection of the air separately from injection of the fuel into the pre-chamber.

8. The engine of claim 1, further comprising oil acting on a valve to control valve opening of the purge pump, and a spring biasing a portion of the purge pump.

9. A method of operating an internal combustion engine in an automotive vehicle, the method comprising:

(a) pressurizing a constant volume pre-chamber, with a source external to a main piston chamber, to at least that of the main piston chamber connected therewith by multiple apertures which are always open;

(b) supplying a fuel into the pre-chamber through a fuel port;

(c) moving a valve of a purge pump due to rotation of a cam;

(d) supplying air to the purge pump and supplying air from the purge pump into the pre-chamber through an air port separate from the fuel port and at least partially prior to step (b);

(e) creating ignition energy in the pre-chamber to ignite the fuel and air in the pre-chamber;

(f) supplying fuel and air into the main piston chamber;

(g) moving combusted material from the pre-chamber through at least one of the apertures;

(h) moving a supplemental piston in the purge pump due to rotation of another cam;

(i) igniting the fuel and air in the main piston chamber with reacting mixture flowing through the apertures of the pre-chamber; and (j) linearly moving an entire main driving piston away from the pre-chamber, within the main piston chamber.

10. The method of claim 9, further comprising oil acting on the valve to control valve opening of the purge pump, and a spring biasing a portion of the purge pump.

11. The method of claim 9, further comprising essentially completely combusting the fuel and air which is a 1.0 (a) or leaner fuel-air mixture in the main piston chamber.

12. The method of claim 9, further comprising:

sensing pressure in the main piston chamber; and automatically changing at least one of: a fuel-air ratio in the pre-chamber, a quantity of the fuel and air in the pre-chamber, ignition timing in the pre-chamber, injection timing of the air versus the fuel in the pre-chamber, or pressure in the pre-chamber.

13. The method of claim 9, further comprising:

sensing ionization in the main piston chamber; and automatically changing at least one of: a fuel-air ratio in the pre-chamber, a quantity of the fuel and air in the pre-chamber, ignition timing in the pre-chamber, injection timing of the air versus the fuel in the pre-chamber, or pressure in the pre-chamber.

\* \* \* \* \*

UNITED STATES PATENT AND TRADEMARK OFFICE
CERTIFICATE OF CORRECTION

PATENT NO. : 10,161,296 B2
APPLICATION NO. : 15/132317
DATED : December 25, 2018
INVENTOR(S) : Harold Schock et al.

It is certified that error appears in the above-identified patent and that said Letters Patent is hereby corrected as shown below:

On the Title Page

Page 2, Column 2, item (56) Other Publications, Line 28, "Pre-Chamer" should be --Pre-Chamber--.

In the Specification

Column 1, Line 28, "Homogenous" should be --Homogeneous--.

Column 3, Line 49, "stoicheometric," should be --stoichiometric,--.

Column 3, Line 50, "stoicheometric" should be --stoichiometric--.

Column 5, Line 13, "propogation" should be --propagation--.

Column 5, Line 16, "propogation" should be --propagation--.

Column 6, Line 24, "113" should be --111--.

Column 6, Line 54, after "cams", insert --.--.

Column 8, Line 57, "θ" should be --0--.

Column 9, Line 31, "FIG." should be --FIGS.--.

Column 9, Line 38, "FIG." should be --FIGS.--.

Column 10, Line 30, "a" should be --λ--.

Signed and Sealed this
First Day of October, 2019

Andrei Iancu
*Director of the United States Patent and Trademark Office*

In the Claims

Column 12, Claim 11, Line 28, "(a)" should be --($\lambda$)--.